March 2, 1943.                W. W. WEAVER                2,312,457
                                 RIVET SET
                              Filed Feb. 2, 1942
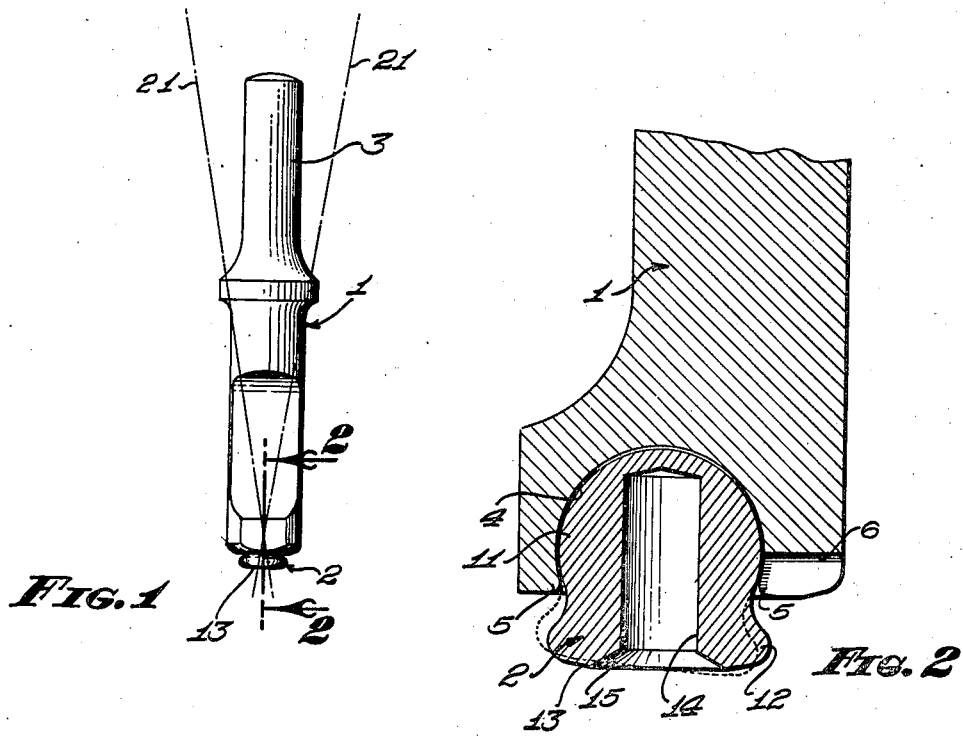
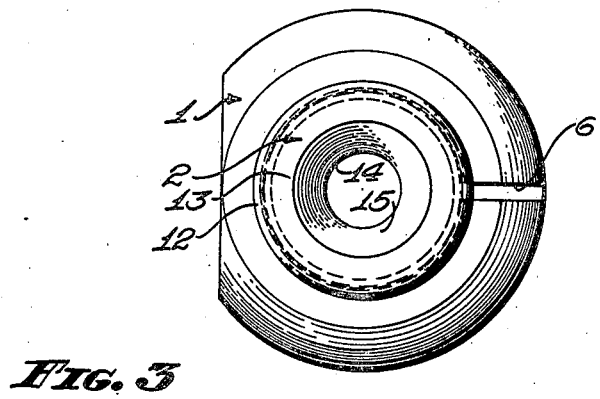
INVENTOR
WALTER W. WEAVER
BY Carlos G. Stratton
ATTORNEY Patented Mar. 2, 1943

2,312,457

UNITED STATES PATENT OFFICE 2,312,457

RIVET SET

Walter W. Weaver, South Gate, Calif., assignor to Aircraft Tools Inc., Los Angeles, Calif., a corporation of California Application February 2, 1942, Serial No. 429,265

5 Claims. (Cl. 78—53.5)

My invention relates to rivet sets, particularly to rivet sets for use in pneumatic riveters or other types of power riveters.

An object of my invention is to provide a rivet set which is self-centering; that is, the rivet set need not be alined accurately with the rivet, but may be cocked or misalined without spoiling or damaging the rivet.

A further object is to provide a rivet set which not only materially speeds up riveting operations by skilled workers, but facilitates satisfactory riveting by inexperienced and unskilled workers.

A still further object is to provide a rivet set which does not require change in the construction of conventional riveting machines, but may be readily substituted for standard rivet sets used therein.

Another object is to provide a rivet set and novel method of construction and assembly which requires only two simple parts, both of these being simple and easily formed.

A still further object is to provide a rivet set which, although having a universal or self-centering feature, need be no larger than standard rivet sets so that it may be readily used in confined spaces.

In the drawing, like reference characters designate similar parts in the several views.

It is to be understood that changes may be made in the details of the construction and arrangement of said embodiment, without departing from the spirit and scope of my invention.

Figure 1 is an elevational view of my rivet set.

Figure 2 is an enlarged, fragmentary sectional view thereof taken through 2—2 of Figure 1; and Figure 3 is an enlarged and elevational view thereof.

The rivet set comprises generally a stem member 1 and a head member 2.

The stem member 1 is shaped as indicated by 3, at its upper end for connection to a conventional power riveter, not shown. The lower or outer end is provided with a semi-spherical socket 4. The socket is greater than a half sphere so that the margins of the opening to the socket form lips 5 and are slightly less than the full diameter of the socket. At one side the socket is intersected by a slit 6.

The head member 2 is likewise provided with a semi-spherical ball portion 11, conforming to the socket 4. The diameter of the ball portion 11 is slightly greater than the width across the lips 5 of the socket so that the ball portion is retained therein, but the relative diameters are such that the ball portion may be forced or snapped in place. This is aided by the slit 6.

The spherical extent of the ball portion 11 is slightly greater than the socket so that the head member has limited universal movement, as indicated by dotted lines in Figure 2. Beyond the ball portion the head member is flared outwardly or flanged, as indicated by 12, and is flattened across the end to form an anvil face 13. The shape of the anvil face may vary, depending upon the type of rivet upon which it is used. One type of rivet requires a recess 14 in the head member, the outer margin of the recess being beveled as indicated by 15.

Both the head member and stem are of necessity made of alloy steel, which must be heat treated before assembly; consequently forming operations on the stem after assembly are impracticable; therefore, the lips 5 of the socket cannot be upset or compressed around the ball after assembly. Thus, the amount of overlap provided by the difference in diameters of the opening to the socket and the ball portion, is such that the material of the stem need not be stretched beyond its elastic limit in order to insert the ball member.

It should be noted that clearance is provided between the ball and socket so that once the ball member has snapped into place, it is freely movable therein and the riveting pressure is transmitted from the head member directly to the base or inner end of the socket.

The extent of universal movement, that is, the limits within which the head member may tilt are such that the head member cannot move too far out of position for proper engagement with the rivet, but tends to aline itself with the normal plane of the anvil face at right angles to the axis of the rivet.

It should be noted that the axis of the stem member may be inclined several degrees out of alinement with the axis of the rivet, as indicated by the inclined center lines 21 in Figure 1. Also, the stem member need not be appreciably larger than the anvil face 13, so that the rivet set may be used in confined spaces. This is particularly desirable, for the difficulty of alining the rivet set is increased when working in limited space, in corners or the like.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A rivet set comprising a stem member adapted to be connected with a riveting machine, said stem member defining a socket in its extremity; an elastic lip formed integrally with said stem member around the mouth of said socket, and capable of limited expansion, said lip being smaller in diameter than said socket, and a head member, including a ball portion adapted to journal in said socket, the ball portion having a diameter greater than the normal diameter of said elastic lip, but less than its limit of expansion, whereby said ball portion may be snapped through the lip into said socket and be retained therein by said lip.

2. A rivet set comprising a hardened ball member, having an anvil face at one side, a hardened stem having a socket in one end adapted to receive said ball member, a constricted elastic split lip portion formed around this entrance of said socket and having a normal diameter smaller than said ball member to retain said ball member in said socket, but having a limit of elasticity capable of passing said ball member.

3. A rivet set consisting solely of a hardened metallic stem member shaped for attachment to a power riveter, and a hardened metallic head member having an anvil face on one side, said head member and the extended end of said stem member forming respectively the elements of a ball and socket joint, the ball being normally retained in the socket by the inherent resilience of the hardened metal of the stem around the socket.

4. A rivet set consisting solely of two members, namely, a stem member shaped for attachment to a power riveter and having a socket in its extended end, said stem member forming around the entrance of said socket an annular retaining lip, there being a radial slot in said lip to permit limited expansion, and a head member having an anvil portion and a ball portion, the ball portion adapted to journal in said socket and of a diameter adapted to snap through said retaining lip and be retained thereby.

5. A rivet set comprising preformed and hardened ball and socket members, the margins of said socket having sufficient spring to admit and retain said ball member; an anvil formed on said ball member, and a stem continuing from said socket member for attachment to a riveting machine.

WALTER W. WEAVER.